June 28, 1955 W. DZUS Re. 24,028

FASTENING DEVICE

Original Filed March 6, 1942

WITNESSES

Geo. W. Naylor

D. H. Rau

INVENTOR

William Dzus

BY

Munn, Liddy, Glascock & Kane

ATTORNEYS

United States Patent Office

Re. 24,028
Reissued June 28, 1955

24,028

FASTENING DEVICE

William Dzus, West Islip, N. Y.

Original No. 2,424,603, dated July 29, 1947, Serial No. 433,587, March 6, 1942. Application for reissue September 7, 1950, Serial No. 183,623

18 Claims. (Cl. 24—221)

Matter enclosed in heavy brackets [ ] appears in the original patent but forms no part of this reissue specification; matter printed in italics indicates the additions made by reissue.

This invention relates to an improved fastening device for releasably securing two articles or parts together.

It is an object of the present invention to provide an improved fastening device having a spring element and a cooperating interengaging stud element in which means are provided whereby the holding tension of the fastening device may be increased beyond the normal or predetermined tension of the spring.

Another object is the provision of an improved fastening device in which the important moving or operative portions thereof are effectively protected from moisture, dust particles, or other foreign matter which might injure or adversely affect the operation of the device.

A further object is the provision of an improved fastening device which is of relatively simple and inexpensive construction, which is simple to operate, and which can be engaged or released by a simple rotary motion through a relatively short arc and which is, nevertheless, of rugged and strong construction and will not accidentally release.

Other objects will be apparent from the following detailed description of the drawing, in which.

Figure 1:
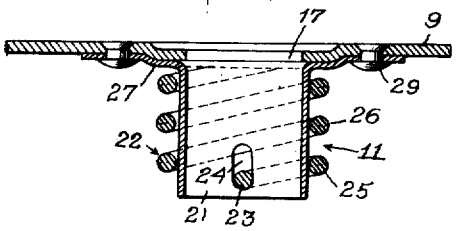
Fig. 1 is a longitudinal sectional view of the anchoring member *or receptacle* of one form of my fastening device.
Figure 2:
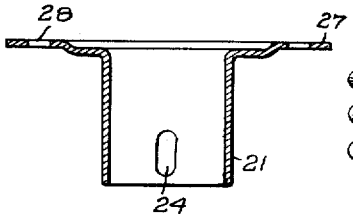
Fig. 2 is a longitudinal sectional view of the core of the anchoring member *or receptacle;*
Figure 3:
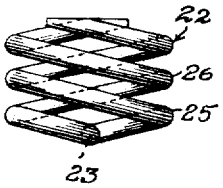
Fig. 3 is an elevational view of the spring element of the anchoring member *or receptacle;*

My fastening device may be used in association with many different types of articles or parts which it is desired to releasably secure together, such as the cowlings of airplanes, removable panels, plates and covers, tarpaulins, and similar devices.

Referring to the first form of my invention, shown in Figs. 1 to 5, inclusive, I have shown the fastening device as releasably securing together a pair of plates 8 and 9. The fastening device comprises a stud member 10 and an anchoring member *or receptacle* 11. The stud member is of the type shown in my Patent No. 1,955,740, granted on April 24, 1934, and consists of an enlarged head 12 having a tubular shank 14 formed with a pair of spiral cam-like slots 15 extending upwardly from the lower end thereof and provided with shoulders 16 so as to prevent retrograde movement of the stud element and accidental release of the fastening device when it is in interengaged position.

The stud member is applied to the plate 8 by projecting it through the aperture 17 formed therein, and it is retained in position by means of a grommet 18 extending around the edge of the aperture and projecting into a groove 19 formed immediately beneath the head. The grommet permits the stud member to freely rotate, but prevents its withdrawal from the plate. So as to facilitate rotation of the stud element, suitable means, such as the kerf 20, may be provided in the head thereof.

The anchoring member *or receptacle* preferably comprises a core 21 consisting of a cylindrical shell and a spring element 22 disposed around the core and preferably taking the form of a double coiled spiral spring. The spring 22 is formed with a connecting link or rod 23 which extends transversely of the core 21 through the pair of slots 24 formed in opposite sides thereof, and the two ends of the link or rod 23 are connected to the coils 25 and 26 which are wound around the core 21 in alternate parallel relationship.

At its upper end, the core 21 is formed with a laterally projecting flange or apron 27 which may be of elliptical shape and which is preferably provided with apertures 28 serving to accommodate means, such as the rivets 29, for attaching the anchoring member to the plate 9. The plate 9 is formed with an aperture concentric with the core or shell 21 to accommodate the shank of the stud element when the fastening device is assembled, and both the plate 9 and the flange 27 may be "dimpled" or downwardly offset immediately surrounding the opening so as to provide clearance or space for the grommet 18.

In assembling the device the stud member and [anchoring member] *receptacle* are applied to the plates 8 and 9, in the manner shown. The stud member is then projected through the aperture in plate 9 and into the core or shell 21. The link or rod of the spring element will then rest in the entrance branches of the cam-like spiral slots 15. Rotation of the stud element in a clockwise direction will draw the link or rod upwardly in the cam-like slots until it is locked behind the retaining shoulders 16. Rotation of the stud element in the opposite direction will release the interengagement between the parts.

Figure 4:
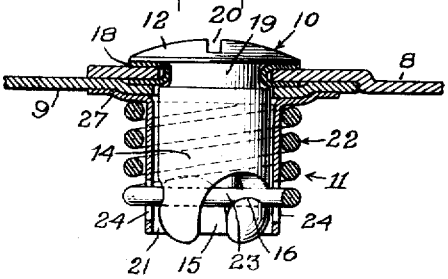
Fig. 4 is a longitudinal sectional view of the first form of my fastening device in assembled relationship and showing the anchoring member *or receptacle* at right angles to the position in Fig. 1.
Figure 5:
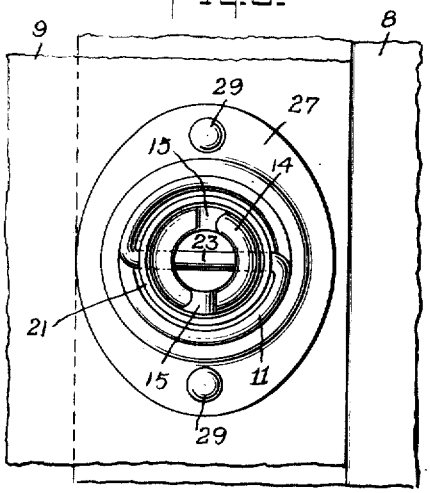
Fig. 5 is a bottom plan view of the first form of my fastening device in assembled relationship.

In this connection, the parts should be so proportioned that when the interengagement is released, the link or rod 23 is normally held by the spring coils at the base of the slots 24, in the position shown in Fig. 1. Accordingly, when the link or rod is drawn upwardly in the cam-like spiral slots, the action is resisted by the force exerted by the normal tension of the spring. The slots 24 should preferably be of such a length as to permit the link or rod 23 to pass over the shoulders 16 without interference from the upper ends of the slots. However, when the fastening device is in fully locked position, as shown in Figs. 4 and 5, the link or rod 23 should be positioned in close proximity to the upper ends of the slots 24.

It will be seen that when the fastening device is in locked position, that spring 22 is partially compressed, and the tension exerted by the spring serves to hold the link or rod 23 locked behind the shoulders 16. Also, the tension exerted by the spring serves to hold the plates 8 and 9 together. If a force should be applied to the plates 8 and 9 serving to pull them apart, this action will be resisted and prevented by the spring 22, if the force is less than the normal force exerted by the [tension of the] spring. Should the force be greater than the normal force exerted by the [tension of the] spring, the plates will pull apart sufficiently to permit the link or rod 23 to engage the upper ends of the slots 24 which serve as additional supports or braces greatly increasing the holding tension of the fastening device. After the plates have shifted apart sufficiently for the link or rod 23 to engage the ends of the slots 24, it will require a considerably greater force to pull the plates further apart. These auxiliary supports or braces for the spring element are of great importance since, in the opening and closing of the fastening device, it is simply necessary to overcome the normal tension of the spring element. However, the actual holding strength or tension of the fastening device is increased considerably above the normal tension of the spring element.

Figure 6:
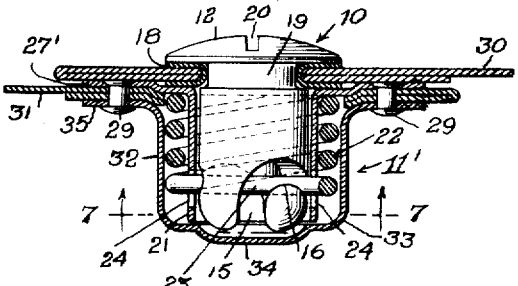
Fig. 6 is a longitudinal sectional view similar to Fig. 4 showing a modified form of fastening device having a protective casing or shell disposed around the anchoring member *or receptacle*.
Figure 7:
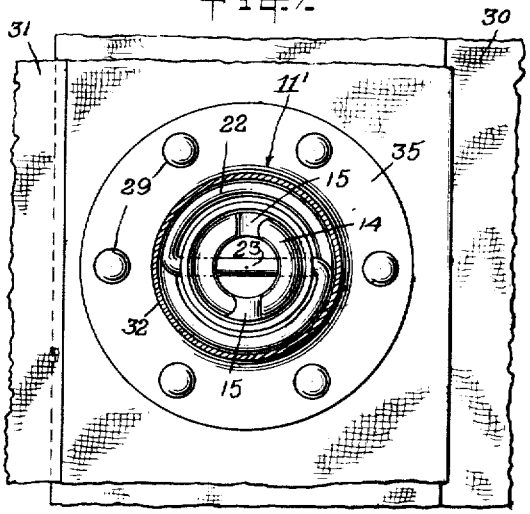
Fig. 7 is a cross sectional view in the direction of the arrows on the line 7—7 of Fig. 6.

Referring now to the form of my fastening device, shown in Figs. 6 and 7, it will be seen that I have provided a protective enclosure in the form of an outer shell or cap which serves to protect the spring element from moisture, dust particles, and other foreign matter.

As in the first form of my invention, it will be appreciated that the fastening device may be used for fastening many different types of articles or parts together. In Figs. 6 and 7, I have shown the device as being used to secure together a pair of articles or parts 30 and 31 made from flexible textile fabric, such as canvas. Each article or part is folded over adjacent its edge, as shown, and provided with apertures so as to accommodate the stud member 10 and the anchoring member *or receptacle* 11′.

The stud member 10 is of the same construction as in the first form of my invention and is applied to the article 30 in the same manner. However, the anchoring member 11′ is of slightly modified construction. Thus, it will be seen that it is provided with a protective casing 32 in the form of a cylindrical shell turned inwardly near its lower end, as shown at 33, and having a dome 34 closing the lower end thereof. At its upper end the casing is provided with a projecting flange or apron 35 which may be of circular shape, as shown, and which in attaching the device to the article 31, is preferably applied to the lower surface thereof immediately surrounding the aperture.

The spring member 22 and the core or inner shell 21 may be of the same construction as in the first form of my invention, with the exception that the flange or apron 27′ at the upper end of the core, is preferably of the same size and shape as the flange 35.

In attaching the anchoring member to the article or part 31, the flange 27′ is preferably applied to the upper surface of the article immediately surrounding the aperture, and the flange 35 to the lower surface, in the manner shown, and rivets 29 are extended through apertures formed in the flanges and article so as to secure the anchoring member in position. It will be seen that the application of the anchoring member to the part 31, in the manner shown and described, serves to protect the fabric around the edges of the aperture. Where the article 31 is made from a rigid material, such as metal, the flanges 27′ and 35 may both be applied to the lower surface of the article.

I have found that it is desirable to proportion the size of the core 21 and protective casing 32 so that the lower end of the core 21 rests upon, or is spaced a short distance above, the turned-in portion of the casing, in the manner shown most clearly in Fig. 6.

When the stud member and anchoring member have been applied to the parts 30 and 31, in the manner shown, the fastening device is operated and used in the same manner as in the first form of my invention. It will be seen that the upper ends of the slots 24 serve as auxiliary or additional supports or braces for the connecting link or rod 23 so that the holding strength or tension of the fastening device may be increased above the normal tension or force exerted by the spring element 22.

In both forms of my invention I have shown the upper ends of the slots 24 as serving as the auxiliary or additional supports or braces for the spring element. It should be understood that other auxiliary supports or braces may also be employed. Thus, for instance, the coils 25 and 26 of the springs may be arranged in close proximity so that when the fastening device is in locked position, as shown in Figs. 4, 5, 6 and 7, the coils are in very closely spaced relationship. Under those circumstances, if the plates 8 and 9 are pulled apart by a force greater than the normal tension of the spring, the adjacent coils will soon contact each other, serving as auxiliary or additional supports for the link or rod 23 and resisting further separation of the plates.

From the foregoing, it will be seen that I have provided an improved fastening device having a spring element and a cooperating interengaging stud element in which additional supports or braces are provided whereby the holding strength or tension of the fastening device is increased beyond the normal or predetermined tension of the spring. It will also be seen that my fastening device is so formed that the important moving or operative parts thereof are effectively protected from moisture, dust particles, or other foreign matter. Thus it will be seen that the outer casing or shell [22] *32* and the combined action of the inner shell, grommet and stud head serve to effectively encase the spring and protect it from the deleterious action of foreign matter of various types.

It should be understood, of course, that modifications may be made in the illustrated and described embodiments of my invention without departing from the invention as set forth in the accompanying claims.

I claim:

1. A fastening device for securing two articles together comprising a stud member adapted to be attached to one of the articles, and an anchoring member adapted to be attached to the other article, said stud and anchoring members being interengageable so as to releasably fasten the articles together, and said anchoring member comprising a tubular core having longitudinally extending slots formed in opposite sides thereof and being formed with a spring disposed around the core and having a portion extending transversely thereof through the slots, the said portion of the spring being disposed adjacent one end of the slots when the members are in interengaged position whereby the said end of the slots may serve as an auxiliary support for the spring.

[2. A fastening device comprising a stud member and an anchoring member said stud member and anchoring member being interengageable and separable, said anchoring member comprising a spring element, and means including a protecting shell disposed around the spring element and open at one end to receive the stud member, said stud member and shell serving to encase the spring member and protect it when the parts are in interengaged position.]

[3. A fastening device comprising a pair of cooperating fastening members, one of said members being formed of a pair of spaced shells having resilient means interposed therebetween.]

[4. A fastening device comprising a pair of cooperating fastening members, one of said members being formed of concentrically arranged spaced shells having a spring interposed therebetween.]

[5. A fastening device comprising a pair of cooperating fastening members, one of said members being formed of a pair of spaced shells having resilient means interposed therebetween, and means extending transversely of the inner shell and normally held in predetermined position by said resilient means, but being shiftable against the force exerted by the said resilient means.]

[6. A fastening device comprising a pair of cooperating fastening members, one of said members being formed of concentrically arranged spaced shells having a spring interposed therebetween, and means extending transversely of the inner shell and normally held in predetermined position by said spring but being shiftable against the force exerted by the said spring.]

[7. A fastening device comprising a pair of cooperating fastening members, one of said members being formed of a pair of spaced shells, one disposed inside the other, and a spring interposed between the two shells and having a portion extending transversely of the inner shell, the said portion being normally disposed in a predetermined position but being shiftable against the force exerted by the spring.]

8. A fastening device comprising a pair of cooperating fastening members, one of said members being formed of a pair of spaced concentrically arranged shells, the inner shell being formed with a pair of apertures at opposite sides thereof, and a double coiled spring interposed between the two shells and having a connecting link extending through the apertures and transversely of the shell, the said link being normally held in a predetermined position by said spring but being shiftable against the force exerted by the spring.

9. A fastening device comprising a stud member and an anchoring member rotatable with respect to each other, the anchoring member being formed of a pair of spaced shells having resilient means interposed therebetween and having retaining means extending transversely of the inner shell and normally held in predetermined position by said resilient means but being shiftable against the force exerted by the said resilient means, the said stud member having means interengageable with the retaining means in the anchoring member upon rotation of one member with respect to the other so as to releasably lock the fastening device in assembled relationship.

10. A fastening device comprising a stud member and an anchoring member rotatable with respect to each other, the anchoring member being formed of a pair of spaced shells, one disposed inside the other, and having a spring interposed therebetween, said spring having a portion extending transversely of the inner shell and normally disposed in a predetermined position but being shiftable against the force exerted by the spring, and the said stud member having means interengageable with the said portion of the spring upon rotation of one member with respect to the other so as to releasably lock the fastening device in assembled relationship.

11. A fastening device comprising a stud member and an anchoring member rotatable with respect to each other, the anchoring member being formed of a pair of spaced shells, one disposed inside the other, and having a spring interposed therebetween, said spring having a portion extending transversely of the inner shell and normally disposed in a predetermined position but being shiftable against the force exerted by the spring, and the said stud member being provided with a pair of oppositely positioned spiral cam slots extending inwardly from one end thereof and having shoulders adjacent their inner ends whereby the said portion of the spring becomes interengaged with the cam slots in the stud member upon the rotation of one member with respect to the other so as to releasably lock the fastening device in assembled relationship.

12. A fastening device comprising a stud member and an anchoring member rotatable with respect to each other, the anchoring member being formed of a pair of spaced concentrically arranged shells and the inner shell having a pair of apertures at opposite sides thereof, and a double coiled spring interposed between the two shells and having a link extending through the apertures and transversely of the shell, the said link being normally held in a predetermined position by said spring but being shiftable against the force exerted by the spring, and the said stud member being formed with a spiral cam slot extending inwardly from one end thereof and having a shoulder adjacent its inner end whereby the cam slot becomes interengaged with the link upon rotation of one member with respect to the other to releasably lock the fastening device in assembled relationship.

13. The combination with a part made of sheet material and having an aperture therein of a fastening element comprising a pair of shells positioned one inside the other and projecting from one side of the part adjacent the aperture, the said shells being provided with laterally projecting flanges at one end thereof, one of the said flanges being positioned on one surface of the part surrounding the aperture and the other flange being positioned on the opposite surface of the part surrounding the aperture, and attaching means extending through the said flanges and part so as to secure the fastening element in position and reinforce the part.

14. The combination as set forth in claim 13 in which resilient means is interposed between the shells.

15. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring member encircling said collar member and associated therewith, a cross-bar member associated with said spring member and adapted to detachably lock in said detent of said spiral slot with the spring under compression when the fastener stud and receptacle members are locked, and travel limit means for restricting the travel of said cross-bar member.

16. A detachable fastener for maintaining two parts locked in [a] close proximity under spring tension, which includes a rotatable stud member for connection to one part, provided with a spiral slot in one end and a detent at the inner recess of said slot and a cooperating receptacle member for connection to the second part, said receptacle member including a collar member, a spring member encircling said collar member and associated therewith and a cross-bar member associated with said spring member and forming an integral part thereof and adapted to detachably lock in said detent of said spiral slot with the spring under compression when the fastener stud and receptacle members are locked.

17. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring member encircling said collar member and associated therewith, a cross-bar member associated with said spring member and adapted to detachably lock in said detent of said spiral slot with the spring under compression when the fastener stud and receptacle members are locked and guideways for guiding said cross-bar member.

18. A detachable fastener for maintaining two parts locked in close proximity under spring tension, which includes a rotatable stud member for connection to one part, provided with a spiral slot in one end and a detent at the inner recess of said slot, and a cooperating receptacle member including a collar member, a spring member encircling said collar member and associated therewith, a cross-bar member associated with said spring member and forming an integral part thereof and adapted to detachably lock in said detent of said spiral slot with the spring under compression when the fastener stud and receptacle members are locked, and a longitudinal slotted guide in said collar member for guiding said cross-bar member.

19. A detachable fastener for maintaining two parts in close proximity under spring tension, which includes a rotatable stud member for connection to one part, provided with a spiral slot in one end and a detent at the inner recess of said slot, and a cooperating receptacle member for connection to the second part, said receptacle member having longitudinal slots at one end thereof and having a cylindrically shaped coil spring mounted thereon, and including a cross-bar member associated with said spring and adapted to be detachably fastened within the detent of said spiral slot and to be guided by said longitudinal slots.

[20. In a detachable fastener, a receptacle member having a collar, a spring encircling said collar, a cross-bar associated with said spring, and travel limit means for restricting the travel of said cross-bar.]

[21. In a detachable fastener, a receptacle member formed with a collar having longitudinal slots at opposite sides thereof, a spring encircling said collar, and a cross-bar associated with said spring and disposed through said slots, said slots serving to guide and limit the movement of the cross-bar.]

*22. A device for fastening two parts together, comprising a receptacle adapted to be attached to one of said parts and having an outwardly extending body portion, said body portion being provided with at least one longitudinal slot; a spring assembly having coils surrounding said body portion and provided with a cross member extending through and guided by said slot; means at the outer ends of said slots for restricting outward movement of said cross member and spring assembly and a stud having a slot adapted to engage said cross member for fastening said parts together, said stud being adapted to be attached to the other of said parts.*

*23. In a fastening device which includes a stud adapted to be attached to one of a pair of plates and a receptacle adapted to be attached to the other of said plates, said stud having an inclined slot therein, the improvement which comprises a receptacle having a tubular body portion provided with longitudinal slots; a coil spring surrounding said body portion and a cross member extending through said slots and engageable by said stud slot, said cross member being constructed and arranged to compress said coil spring when moved toward said plates by said stud; and means at the outer end of said body portion for restraining outward movement of said cross member and coil spring.*

*24. In a separable fastening device of the type having a spiral-cam stud member and a receptacle member engageable with each other upon the rotation of one with respect to the other, the improvement which comprises a receptacle member having a pair of tubular shells having side walls spaced radially from each other, spring means interposed between said shells, and a locking cross-bar extending in a free unsupported span transversely of the inner shell and operatively associated with the spring means so as normally to be held in one predetermined position, said inner shell being open at one end and being free from obstruction from said open end to the locking cross bar and said inner shell being of a size and shape to accommodate said spiral cam stud member whereby the spiral cam stud member may be inserted into the inner shell and engaged with the locking cross bar so as to shift the locking cross bar against the force exerted by the spring means.*

*25. In a separable fastening device of the type having a spiral-cam stud member and a receptacle member engageable with each other on the rotation of one with respect to the other, the improvement as set forth in claim 24 in which the inner shell is provided with diametrically opposite, longitudinally extending slots and the locking cross-bar is disposed in those slots.*

*26. In a separable fastening device of the type having a spiral-cam stud member and a receptacle member engageable with each other on the rotation of one with respect to the other, the improvement which comprises a receptacle having an attaching portion and a tubular collar extending outwardly therefrom, said collar having diametrically opposite, longitudinally extending slots formed therein, a locking cross-bar extending in a free unsupported span transversely of the collar and being disposed in and shiftable along said slots, and a helical spring disposed between the attaching portion and the locking cross-bar so as to normally hold the locking cross-bar in one predetermined position, said tubular collar being open at the attaching portion and being free from obstruction from the attaching portion to the locking cross bar and said tubular collar being of a size and shape to accommodate said spiral cam stud member whereby the spiral cam stud member may be inserted into said tubular collar and engaged with the locking cross bar so as to shift the locking cross bar against the force exerted by the spring.*

References Cited in the file of this patent or the original patent

UNITED STATES PATENTS

| | | |
|---|---|---|
| 659,781 | Ball | Oct. 16, 1900 |
| 1,172,732 | Pulliam | Feb. 22, 1916 |
| 1,322,772 | Eiliott | Nov. 25, 1919 |
| 2,110,435 | Albin | Mar. 8, 1938 |
| 2,215,238 | Wert | Sept. 17, 1940 |
| 2,261,369 | Henry et al. | Nov. 4, 1941 |
| 2,295,488 | Mack | Sept. 8, 1942 |
| 2,306,967 | Mack | Dec. 29, 1942 |

FOREIGN PATENTS

| | | |
|---|---|---|
| 339,141 | Great Britain | of 1930 |
| 816,501 | France | May 3, 1937 |